United States Patent [19]
O'Lenick et al.

[11] 3,778,965
[45] Dec. 18, 1973

[54] LOADING SYSTEM FOR PACKING MACHINE

[75] Inventors: Anthony J. O'Lenick, Fairlawn; Douglas P. Roome, Cedar Grove; Joseph T. Gabriel, Lincoln Park, all of N.J.

[73] Assignee: Standard Packaging Corporation, New York, N.Y.

[22] Filed: Dec. 17, 1971

[21] Appl. No.: 208,847

[52] U.S. Cl. ............................ 53/248, 53/258
[51] Int. Cl. ................................. B65b 39/02
[58] Field of Search .............. 53/23, 247, 248, 53/252, 258, 260

[56] References Cited
UNITED STATES PATENTS
2,656,656  10/1953  Murdoch et al. ............ 53/124 D X
3,191,358  6/1965  Scherr et al. ................ 53/248 X
3,673,756  7/1972  Prete et al. .................. 53/248

*Primary Examiner*—Travis S. McGehee
*Attorney*—Morton Amster et al.

[57] ABSTRACT

A loading system for use in a packaging apparatus is disclosed as including a conveyor for moving the article to be packaged to a first operations station and then to a loading station. At the loading station, clamps are provided to grip the article, loading doors are provided to support the article while it is being clamped and to release the article into a package element. Stationary guides are provided at the loading station to assist in directing the article upon its release through the loading doors. Furthermore, the loading doors themselves are constructed and arranged to funnel the article in cooperation with the stationary guides in precise position to the package element, which precise position is necessitated to avoid jamming of the apparatus by the article.

2 Claims, 5 Drawing Figures

LOADING SYSTEM FOR PACKING MACHINE

This invention relates primarily to packaging machines and more particularly to loading systems therefor and methods of loading articles to be packaged.

A multitude of prior art machines and methods have been devised for automatically packaging products including those which form packages from heat-sealable, flexible packaging material. Such packages have found wide acceptance, for instances in the food packaging industry because of the extended shelf-life afforded to the packaged product or article by use of such materials. Meats, cheeses, nuts and dried fruits have particularly benefited from the use of such materials and processing schemes in packaging apparatus, since such food products must be protected from oxidizing influences and usually are vacuum sealed for preservation purposes.

Prior art apparatus includes means for conveying a plurality of packages, for example, packages of cheese through various operation stations. A first station might include means for forming a plurality of cheese packages at any one time, the packages having top and bottom, heat-sealable web members, conveyed along with the packaged articles through various operation stations such as sealing stations, cutting stations and leak detection stations. More particularly, the packages are formed in a die member which is constructed to include side and bottom walls defining a package cavity, which cavity is used to produce a particular form for the lower web of the package by top air pressure and bottom vacuum. A concave lower web member is thus formed as a liner for the die cavity to receive the article for further packaging operations. The dies used for such packaging purposes are usually of a metal material and it becomes incumbent upon the loading system to load the article into the bottom web packaging cavity in a precise locating manner, so as not to jam the mechanism. In other words, since the lower package web and the die cavity are in motion just before and after the loading operation for the article to be packaged, a slight lack of coordination between the operation of the loading unit and the indexing of the conveyor unit carrying the dies and web or a slight variation in dimensions of the article will cause a breakdown of the apparatus and concomitant repairs and delay. Of course, in mass production such drawbacks are fatal from an economic point of view.

An example of existing packaging apparatus may be found by reference to co-pending U.S. Pat. application, S.N. 157,228 filed June 28, 1971 and also assigned to Standard Packaging Corporation.

Accordingly, a primary object of the present invention is to provide a fully automatic, continuous packaging apparatus including a coordinated loading system therefor.

A further and more particular object of the present invention is to provide a loading system for automatic packaging apparatus which includes means for precisely aligning and directing the article to be packaged in order to prevent jamming and attendant difficulties with the apparatus.

These and other objects of the present invention are accomplished in one illustrative embodiment thereof which features an apparatus and method for loading an article into a packaging element for further packaging operations. The loading system includes a conveyor system for moving the article to a first operations station and then to a loading station. The loading station includes clamps, loading doors for supporting the article and for guiding it into the bottom web of the package, clamps for gripping the article until the loading doors are fully opened, a plunger for pushing the article through the opened loading doors as the article is released by the clamps and stationary guide members for cooperating with the opened loading doors in order to form a four-sided, funnel-like, guide to direct the article precisely into the bottom web of the package. More specifically, the loading doors are rotatable by means of an air motor and are constructed, for instance, in units of two sets of three doors each, which together form a platform for a four-sectioned article to be packaged upon arrival at the loading station. The end doors of each set, together with a central, double door of each set form with the stationary guide members a funnel-like passage for the articles as the air motor opens the doors to allow articles to pass, respectively, between one end door and the central door and the other end door and the central door. Rotation of the loading doors after directing the article to be packaged into the die is accomplished in a direction below the platform formed by the doors coordinate with the direction of indexing of the die cavities and webs. In this way, slight errors in positioning or dimensions of the article to be packaged with reference to the die cavities do not cause jamming of the mechanism by the article.

The above brief description, as well as further objects, features and advantages of the present invention will be more fully appreciated by reference to the following detailed description of the preferred, but nonetheless illustrative, embodiment when taken in conjunction with the accompanying drawings, wherein.

Figure 1:
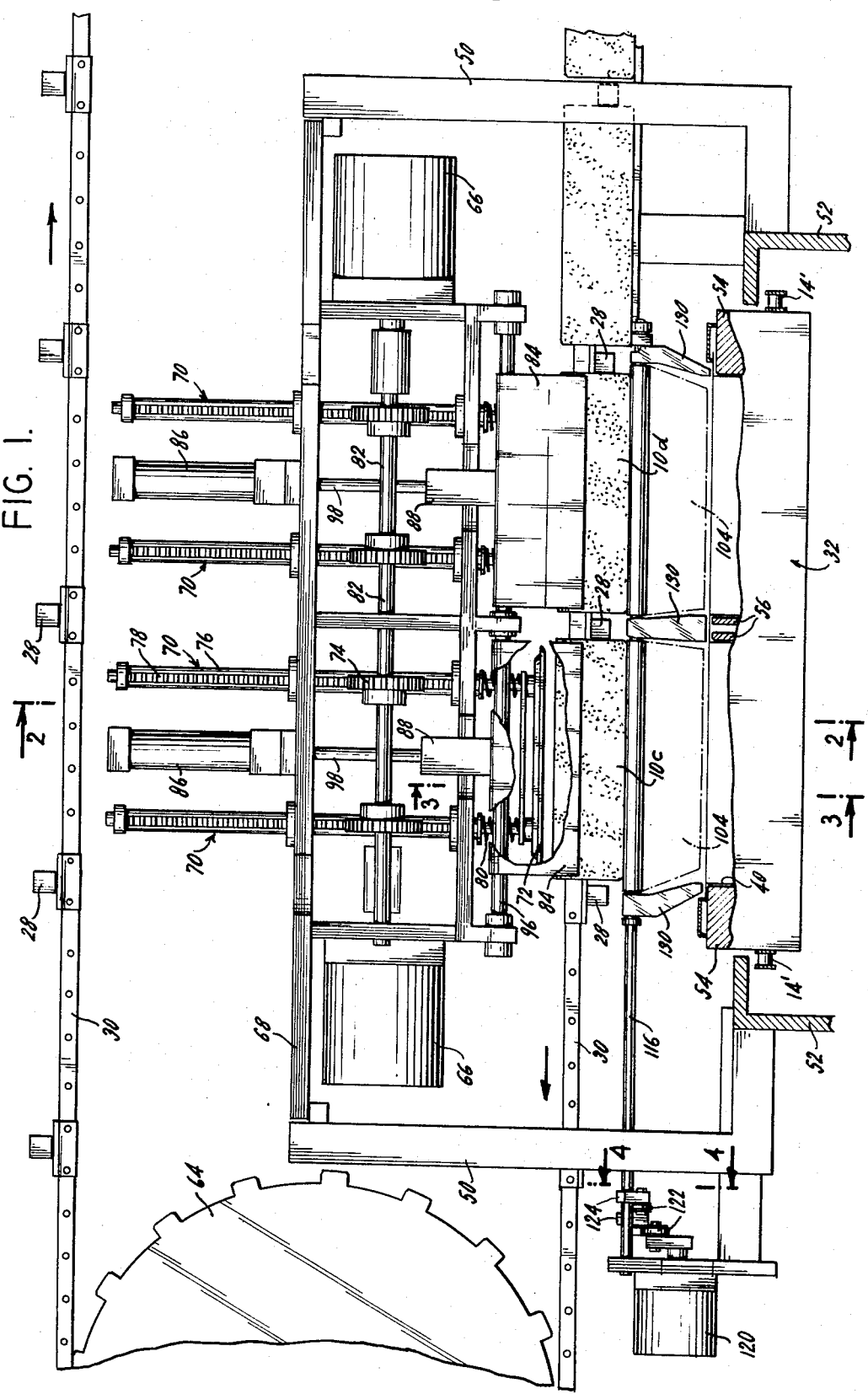
FIG. 1 is a front view, partly broken away and partly in section of a loading system apparatus according to the present invention showing particularly such apparatus in combination with package die cavities into which article sections are loaded by the loading apparatus.
Figure 4:
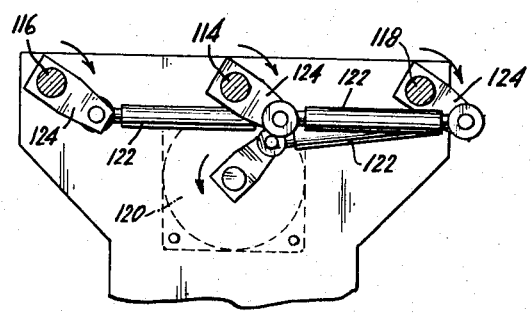
Figure 5:
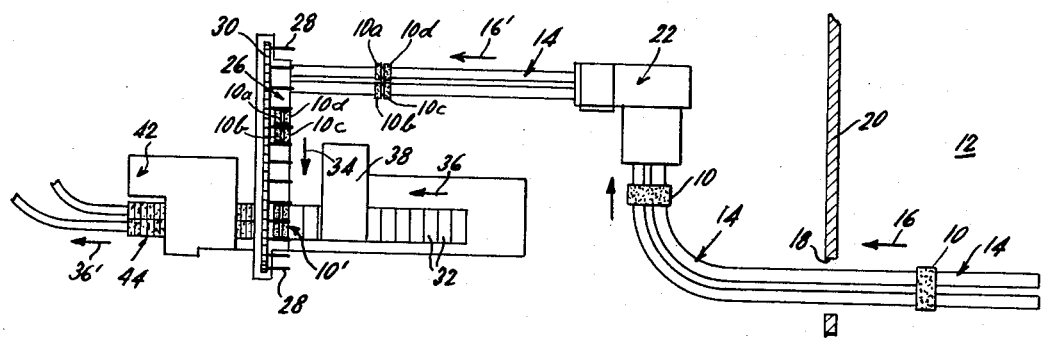

FIG. 4 is a partial, section view taken along line 4—4 of FIG. 1 of the linkage connecting the loading doors with an air motor controlling the door positions; and FIG. 5 is a schematic representation of a loading system according to the present invention showing particularly the conveyor system therefor and the flow of the articles to be packaged through a first cutting station and then to the loading station according to the present invention prior to the packaging stations operations for the article.

Referring to the drawings, and particularly FIG. 5 thereof, a typical sequence of operations for the preparation, cutting and loading of an article 10 will now be described. For the purposes of this specification, it will be assumed that the article 10 is a mold of cheese. Thus, in the usual way, the mold of cheese is aged and otherwise processed in a so-called stripping room, generally designated 12, where the covering paper is removed from the mold of cheese 10. A conveyor generally designated 14 is used to transport the mold of cheese 10 in direction 16 through an opening 18 defined by a wall 20 of the stripping room 12.

Conveyor 14 brings the mold of cheese 10 to a first cutting station including cutter and turntable 22 wherein the mold of cheese 10 is sliced along two orthogonal planes to produce a series of four sectioned strips of the cheese mold. Accordingly, after passing through the cutter and turntable, which is used to turn the mold of cheese by 90°, a series of sectioned strips of cheese is now transported by conveyor 14 in direction 16' with each strip including mold sections 10a, 10b, 10c, 10d. The sizes of such sections are determined by the die cavity size to be used. Mold sections 10a, 10b, 10c, 10d are then mounted by the conveyor system 14 onto platform 26 with each pair of mold sections 10a, 10d being separated from another pair of mold sections 10b, 10c by push bars 28 and the push bars being carried by chain 30 in an endless configuration to dies 32 of the packaging machine. The push bars cause the pairs of mold sections to be conveyed in direction 34 for intersection with direction 36 of the dies 32.

Dies 32 are coordinated in motion with web feeding and forming apparatus 38 prior to the intersection. At and with apparatus 38, a web of packaging material 40 (see FIG. 2) is moved over the cavities with suction from below and air pressure from above being used to form a bottom package member lined with the web 40. Thus the web 40 is made to conform to the cavities defined by the dies 32. At the point of intersection of the motion of chain 30 and dies 32, the loading apparatus according to the present invention is operative to deposit mold sections 10a, 10b, 10c, 10d, all at the same time, into dies 32. The motion of dies 32 in direction 36 is indexed (stop and go) and programmed such that dies 32 stop just under the position of mold sections 10' shown in FIG. 5; and the mold sections 10' by indexing action of chain 30 also stop at the same time and place. At that point in the process, as will be explained more fully herein, the cheese mold sections are clamped just before the loading doors of the loading apparatus begin to open. As the loading doors open, the cheese mold sections are held by the clamps until a plunger (one for each mold section) is brought into contact with the upper surface defined by the cheese mold sections. At the point of contact of the mold section with the plunger, the clamps open and the plunger pushes the cheese downward toward the die cavities aided by stationary guide members and the opened loading doors themselves, as will be explained more fully. After the loading operation is completed, the plunger is moved upwardly away from the die cavities and the loading doors then close to re-assume their platform position for supporting the next four mold sections moved to the aforementioned intersection by push bars 28 and chain 30.

The cheese mold sections 10a, 10b, 10c, 10d on the package bottom webs in the die cavities are then moved to packaging apparatus generally designated 42 for disposition of a package top web, for cutting of the packages, for sealing, for leak detection and for any other packaging operation which might be required for the packages. The packaged and processed cheese mold sections 44 are then moved in direction 36' for shipment and/or further packaging in crates.

Referring now to the other drawings, FIG. 1 shows the loading apparatus as including loading apparatus frame 50 which generally defines a die passage 52 through which dies move during the loading operation. The dies 32 include side and median walls 54, 56 such that the die is compartmentalized into, for instance, four die cavities, one for each mold section of cheese. As an example, looking at FIGS. 1 and 2, mold sections 10c, 10d, 10b are shown in various stages of the loading operation, whereas in FIG. 3, mold sections 10b, 10c are shown nearing the completion of the loading operation, having been deposited into web-lined die 32 and properly located in die cavities defined by front and back walls 58, 60 and transverse median walls 62.

Referring again to FIG. 1, the push bars 28, moved by chain 30 by means of sprocket 64 and other appropriate apparatus, causes the mold sections in an indexing motion to locate in a position as shown in FIG. 1 ready for the loading operation.

Air motors 66 located beneath top frame 68 are programmed by suitable programming apparatus (not shown) to operate the plunger mechanism, generally designated 70, in sequence with the motion of push bars 28 (and thus in sequence with the motion of mold sections 10a, 10b, 10c, 10d). Air motors 66 control plungers 72 by means of gears 74 in interlocking relationship with plunger poles 76. Plunger poles 76 are appropriately truncated to define pole rack teeth 78 to interlock with the teeth of gears 74. As with most air motors, air motors 66 are designed for reciprocal operation such that racks 78 move up and down in a preprogrammed sequence and timing to control plungers 72. Between plungers 72 and pole rack teeth 78, springs 80 are located to cushion the force with which plungers 72 impact upon the cheese mold sections. Furthermore, in the event of slight dimensional variations of a particular mold section, such springs 80 are designed to compensate for the variations. The gears 74 are connected to air motors 66 by shafts 82 and suitable bearings or the like.

Clamps 84, for holding the mold sections of cheese until the impact thereon of plungers 72, are designed also for reciprocal and time controlled action under control of plunger air cylinders 86 which in turn are controlled by a programming apparatus (not shown). Connection between air cylinders 86 and clamps 84 is shown particularly in FIG. 3 wherein connectors 88 impart motion to clamps 84 in spreading directions 90 and clamping directions opposite thereto. Connector 88 is pivoted at pins 92 to links 94, which in turn are fixed to shafts 96 and thus to the clamps 84 themselves. Thus, a downward motion of shaft 98, imparted to connector 88 from air cylinder 86 produces an outward motion of clamps 84 in direction 90. Such motion releases the grip of clamps 84 on the cheese 10'. Specifically, shaft 98 is inserted through an opening 100 defined at the top of connector 88 with the shaft 98 being encircled within the connector by an appropriate spring 102, again to compensate for minor variations in either the cheese itself or in any of the mechanisms.

Figure 2:
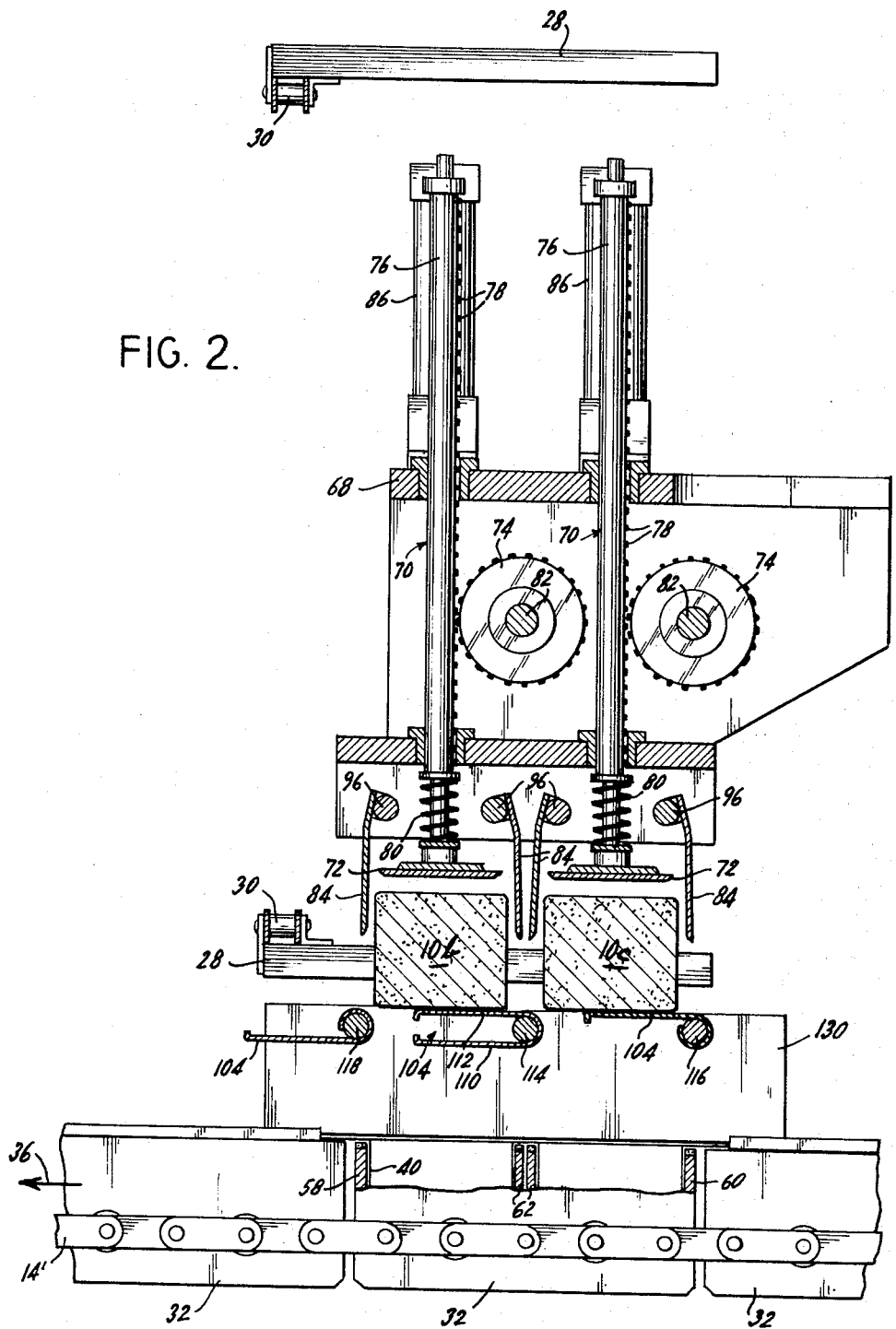
FIG. 2 is a side sectional view taken along the line 2—2 of FIG. 1 and showing particularly the platform formed by the loading doors of the loading apparatus just prior to clamping and just after arrival of the articles to be packaged at the loading station.
Figure 3:
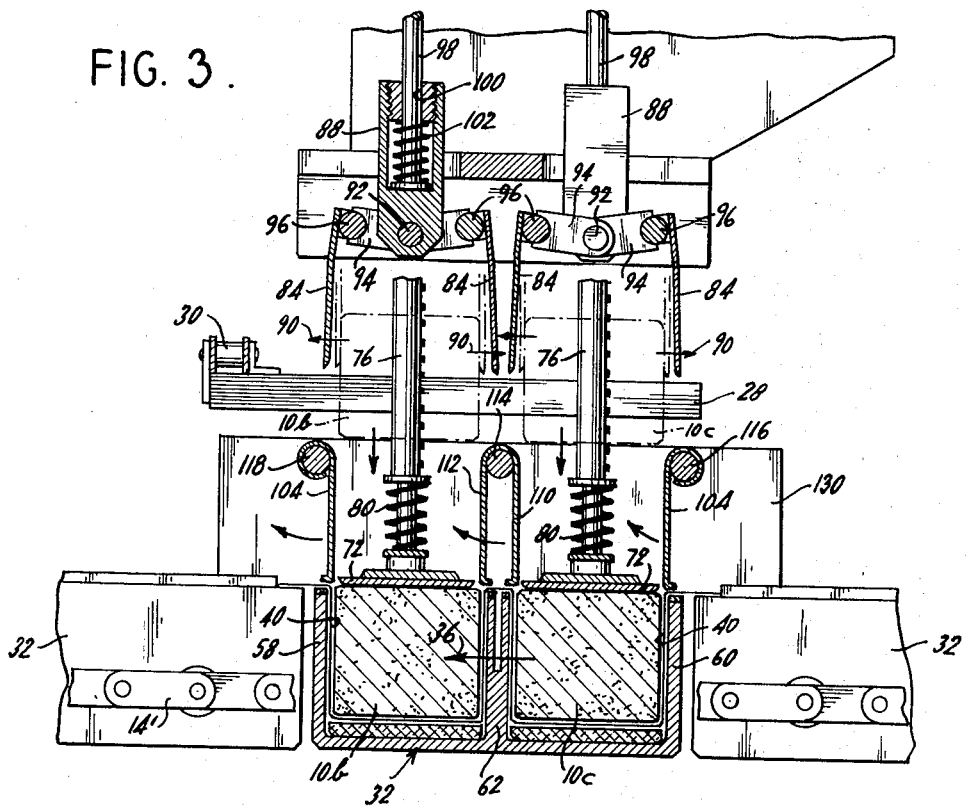
FIG. 3 is a side sectional view of the apparatus of FIG. 1 taken along the line 3—3 of FIG. 1 and showing particularly the loading doors in opened or guiding position just after the articles to be packaged are lowered into the die cavities.

As was stated previously, the loading doors 104 of the loading apparatus of the present invention are designed and constructed to rotate in a particular direction (clockwise) as shown in FIG. 3 to form a platform after depositing the cheese in the dies. Such rotation, generally in the same direction as the direction 36 of die motion prevents jam-ups in the mechanism. In the platform position of loading doors 104 (FIG. 2) it may be seen that one of the end loading doors 104 (the right loading door of FIG. 2) and the central loading door, generally designated 104, function as the platform elements for mold sections 10b, 10c (as well as the other two mold sections of the cheese slice). More particularly, the central loading door 104 includes upper and lower loading door elements 110, 112, both rotatable on the same shaft 114 and integrally constructed with each other. On the other hand, the right loading door (FIG. 2) is rotatable on shaft 116 and includes only an upper loading door element. The left loading door 104 is rotatable on shaft 118 and includes only a lower loading door element.

Rotation of the loading doors 104 is controlled by a reciprocating air motor 120 (FIG. 4) which has an output in the counterclockwise direction to move the loading door shafts 114, 116, 118 in a clockwise direction by means of links 122 and connecting plates 124 as shown. Clockwise output of the motor produces counterclockwise shaft motion.

Stationary guides 130 form, with loading doors 104 in opened position (FIG. 3) a funnel-like passage for mold sections of cheese to drop them into the web-covered die cavities. The funnel-forming function of loading doors 104 is particularly enabled by the design and construction of the loading doors shown most clearly in FIG. 2. For instance, as shown in FIG. 3, the left loading door 104 and the upper central door element 112 form two walls of a four wall passage for a mold section 10b. The right loading door 104 and the lower central loading door element 110 form two walls of a four wall passage for mold section 10c. The same type of loading door set is used for mold sections 10a, 10d to operate in the same manner.

To better enable a complete understanding of the present invention, a typical sequence of loading operations will now be described with reference to the apparatus of the loading system just described. A conveyor 14 carries a mold of cheese 10 from a stripping room 12 through opening 18 defined by the wall 20 of the stripping room. The mold of cheese 10 is then conveyed for ninety degrees rotation and for cutting into slices with each slice being cut into four (as an example) mold sections 10a, 10b, 10c, 10d. The mold sections are then deposited onto platform 26 and moved along in sets of two by means of push bars 28. Concurrently, chain 14' moves dies 32 through a bottom web forming station 38 such that the die cavities are covered with a formed web which is to become the bottom of the cheese package. At the location of the intersection of platform 26 and chain 14' a loading apparatus is used to deposit four mold sections at a time into the web-lined die cavities.

Accordingly, a dwell position occurs for both platforms 26 and chain 14' at the intersection thereof whereupon clamps 84 move in a direction to grip the mold sections of cheese just after they come to rest upon a platform formed by two of the three loading doors in each set of loading doors (starting point for this initial operation is shown in FIG. 2).

The loading doors are then rotated counterclockwise in an opening motion with the mold sections being held by the clamps 84 until plunger 72 contacts the mold section. The clamps open and the plunger starts to push the mold section downward simultaneously, driving the mold section into the web-lined die cavities. This last motion is aided particularly by stationary guides 130 and the funnel-forming construction of opened loading doors 104.

Plunger 72 then moves upwardly and loading doors 104 close by rotating counterclockwise (FIG. 3) to receive the on-coming mold sections of the next cheese slice.

What is claimed is:

1. A loading system for use in a packaging apparatus to load articles to be packaged into a package element comprising clamps for gripping an article and loading doors rotatable between platform and opened positions for supporting an article while it is gripped by said clamps, said loading door being arranged in a location relative to said package element such that rotation of said loading doors to an opened position releases and guides said article to said package element, one of said loading doors including a single, first upper loading door element and another loading door including both second upper and first lower loading door elements, said first upper loading door element and said lower loading door element forming together a funnel for said article when said loading doors are rotated to an open position.

2. The invention according to claim 1, wherein a third loading door is provided and includes a single, second lower loading door element, which with said second upper loading door element forms a second funnel for a second article.

* * * * *